United States Patent [19]  
Onishi et al.

[11] Patent Number: 4,977,496  
[45] Date of Patent: Dec. 11, 1990

[54] BRANCHING CONTROL SYSTEM

[75] Inventors: Katsumi Onishi; Yuto Ono, both of Kawasaki, Japan

[73] Assignee: Fujitsu Limited, Kawasaki, Japan

[21] Appl. No.: 752,190

[22] PCT Filed: Nov. 8, 1984

[86] PCT No.: PCT/JP84/00536
  § 371 Date: Jun. 25, 1985
  § 102(e) Date: Jun. 25, 1985

[87] PCT Pub. No.: WO85/02280
  PCT Pub. Date: May 23, 1985

[30] Foreign Application Priority Data
  Nov. 16, 1983 [JP] Japan .................. 58-215196

[51] Int. Cl.$^5$ .................................. G06F 7/00
[52] U.S. Cl. ........................ 364/200; 364/231.8; 364/263.1; 364/261.3; 364/261.7; 364/259; 364/259.2; 364/258; 364/258.1; 364/271.6
[58] Field of Search .......... 364/200 MS, 200, 900, 364/900 MS

[56] References Cited

U.S. PATENT DOCUMENTS

| | | | |
|---|---|---|---|
| 4,110,822 | 8/1978 | Porter et al. | 364/200 |
| 4,187,539 | 2/1980 | Eaton | 364/200 |
| 4,197,578 | 4/1980 | Wada et al. | 364/200 |
| 4,373,180 | 2/1983 | Linde | 364/200 |
| 4,399,507 | 8/1983 | Cosgrove et al. | 364/200 |
| 4,430,711 | 2/1984 | Anderson et al. | 364/200 |
| 4,435,756 | 3/1984 | Potash | 364/200 |
| 4,438,492 | 3/1984 | Harmon, Jr. et al. | 364/200 |
| 4,454,578 | 6/1984 | Matsumoto et al. | 364/200 |

Primary Examiner—Eddie P. Chan  
Assistant Examiner—Rebecca L. Rudolph  
Attorney, Agent, or Firm—Staas & Halsey

[57] ABSTRACT

According to the present invention, a calculation for determining branching conditions is carried out during the fetching of the branch-to instruction. The branching instruction causes a branch to the specified branch-to address depending on whether an incremented index is larger or smaller than a comparison number. The determination is made by adding an increment to the index and comparing the result with the comparison number. These BXH and BXLE instructions can be processed at a high speed.

16 Claims, 6 Drawing Sheets

FIG. 1

| OP | RI | R3 | B2 | D2 |
|----|----|----|----|----|

BRANCHING CONTROL SYSTEM

DESCRIPTION

CROSS REFERENCES TO RELATED APPLICATIONS

This application is related to U.S. applications having Ser. Nos. 758,664; 758,665 and 755,321.

BACKGROUND OF THE INVENTION

1. Field of the Invention

The present invention relates to a branching control system, particularly a branching control system in a data processing unit having pipeline control where the amount of processing necessary for cancellation of one branch when successful branching has occurred is reduced by generating a branching address and fetching an instruction at a branch-to address while executing condition testing of the branching instruction.

2. Description of the Related Art

In recent large scale computer systems, it has become common for data to be processed quickly using a pipeline type system. High speed processing utilizing the characteristics of a pipeline can be used for processing ordinary instructions that flow sequentially. However, with respect to branching instructions, the successive instructions already fetched and residing in the pipeline may have to be invalidated when the branching conditions are finally determined, generating lost-cycles. Particularly, for data base processing operations or the online data processing operations which are the data processing operations receiving increased attention, the ratio of executing branching instructions to non-branching instruction is large and the lost-cycles generated in the pipeline system are high in number and therefore a pipeline processing system which can reduce the number of lost-cycles is greatly desired.

Operations by prior art systems, when an index high branching (hereinafter referred to as BXH) instruction or the index low equal branching (hereinafter referred to as BXLE) instruction are executed in the data processing system which executes instructions in a pipeline, are explained below. The BXH instruction and BXLE instruction are of the register storage (RS) type as shown in FIG. 1, where OP is the operation code area; R1, R3, B2 are register designation areas. The contents of general purpose register R1 is the first operand, the contents of general purpose register R3 is the third operand and the value obtained by adding a displacement value of D2 to the contents of general purpose register B2 becomes the second operand.

The BXH instruction branches to the address indicated by the second operand when an increment of the third operand is added to said first operand (hereinafter referred to as an index) and the result is larger than a comparison number designated by the contents of the R3 register area. Even when the branch is not taken, the content of the first operand is updated by the increment. The increment is the content (third operand) of the general purpose register designated by R3 as mentioned above. The comparison number is in the next general purpose register having an odd number, for example when R3 indicates an even numbered register, the comparison number is the content of general purpose register indicated by the content of R3+1, and when R3 indicates an odd numbered register, the comparison number is the content of the general purpose register indicated by R3.

It is also possible that the general purpose register includes the same comparison number as the first operand and in this situation an initial value before adding the increment is used as the comparison number.

The BXLE instruction is the same as said BXH instruction, except that the conditions for branching are inverted and branching is carried out when the index is smaller than or equal to the comparison number.

The pipeline operations in the prior art system for executing the BXH and BXLE instructions are explained with reference to FIG. 2. In FIG. 2, P1, P2, P3, P4, P5 and P6 are pipeline stages and the general operations thereof are as follows:

Stage P1: performs decoding of instructions and from general purpose registers;
Stage P2: performs calculation of operand address and generation of buffer memory access request;
Stage P3: performs conversion of logical address to real address by address conversion buffer;
Stage P4: performs a buffer operation for operand memory access;
Stage P5: performs an arithmetic operation; and
Stage P6: performs writing of the operation results to the general purpose registers.

Execution of branching instructions using a pipeline is generally performed in such a manner that one instruction can develop one or a plurality of flows, the original flow and the branch flow.

The construction of the prior art system for performing the processing shown in FIG. 2 is different from the present invention shown in FIG. 6 but the systems are substantially the same in their essential parts for the purpose of explanation in this application. Here, the pertinent portions are briefly explained and the differences will be explained later. The stages P1 to P6 shown in FIG. 6 are the same as the stages mentioned above and the stages I1, I2 and I3 shown in FIG. 6 are stages for instruction prefetch for the pipeline and operations in each stage are as follows:

Stage I1: sends the generated branching address to the address conversion buffer;
Stage I2: converts a logical address to a real address using the address conversion buffer;
Stage I3: accesses the buffer memory using said real address; and
Stage P1: reads an instruction from buffer memory, decoding it and reads operands from registers.

The address conversion buffer may be considered either as part of the cache memory 16 or 20, or in a preceding stage (not shown).

An address of an instruction to be executed is loaded into instruction address register (hereinafter referred to as IAR) 11, the instruction is read using the effective address register (hereinafter referred to as EAR) 15 from the cache memory 16 and is loaded into the instruction word register (hereinafter referred to as IWR) 17. The IWR 17 generally is a shift register with plural stages and a plurality of instructions to be processed by the pipeline are sequentially prefetched and stored therein.

The prefetched instructions are extracted or output using the selector 18 and sent to the hardware pipeline indicated in stages P1 to P6. The operation code area (OP area) in the instruction is shifted in registers 28, 29,... 32 sequentially with each advancement to a new stage. The address of the operand corresponding to the instruction is calculated by an adder 4, the corresponding operand is read from the cache memory 20 and then supplied to a calculation or arithmetic circuit 9. The calculated result is loaded into one of the general purpose registers 22 through a result register 10. During this period, when the instruction sent to the pipeline is a branch instruction, a branching determination circuit 33 shown in the FIG. 6 determines whether branching should occur.

The reference numerals 1, 2, 3, 4, 5, 6, 7, 8, 9, 10, 11, 12 in FIGS. 2 to 4 correspond to the same units having the same numerals shown in FIG. 6.

In the prior art, if a request to execute a branching instruction using the functions of each stage as described above occurs in the first flow, as shown in FIG. 2, the content of general purpose register indicated by R1 of the instruction is loaded into the base register (hereinafter referred to as BR) 1 while content of general purpose register indicated by R3 is loaded into the index register (hereinafter referred to as XR) 2 in the stage P2 of the first flow of the branching instruction. An addition of the first operand and an increment is carried out using a 3-input adder 4 (where an address generating circuit comprises BR 1, XR 1, DR 3 described later and 3-input adder 4). The result is loaded into the operand register (hereinafter referred to as 2R) 8 in stage P5 via the P3 cycle operand address register (hereinafter referred to as P30AR) 5 in stage P4 cycle operand address register (hereinafter referred to as P40AR) 6 in the stage P4. Simultaneously, a comparison number from the general purpose register indicated by R3+1 or R3 is loaded into the operand register 7 (hereinafter referred to as 1R), a comparison is performed in the adder 9. As a result, a signal indicating the relationship between the values 1R and 2R (namely, a signal indicating 1R=2R, 1R>2R, 1R<2R) is output and simultaneously the value of 2R is loaded into a result register (RR) 10. The branching operation is determined based on the signal which indicates the relationship between 1R and 2R. In the system of the prior art, the comparison operation is carried out in stage P5.

Next, in the stage P2 of the second pipeline flow, a value in general purpose register indicated by B2 of the instruction is loaded into BR 1, a value of D2 is loaded into a displacement register (hereinafter referred to as DR) 3, the branching address is generated by the 3-input adder 4 used for the first flow, and the address is then loaded into the instruction address register (hereinafter referred to as IAR) 11 in the stage P3 and simultaneously a branching address instruction read request is issued as soon as the branch-to address is generated in stage P2. Thereby, the instruction extraction pipeline [I1, I2, I3, P4] is loaded and in this case the branch-to address instruction is loaded.

The branching address instruction extraction pipeline allows processing to sequentially advance to stages I1, I2 and I3 and the branch-to instruction is output to the stage P1. When branching is successful, the branch-to enters the instruction execution pipeline.

Writing of a value where an increment is added to the index value of the first operand of the general purpose register R1 to update the index is carried out using the general purpose registers indicated by RR10 to R1 at the end of stage P6 of the second flow.

As is apparent from FIG. 2, in the prior art system, the prefetch of a branch-to instruction is carried out for the instructions, when branching is not successful, that follow said branch. When the third flow of the not-successful branch-to instructions changes stages from the stages P1 to P2, the branching address instruction can be fetched in the stage P1. However, the instructions for as many as three flows must be aborted until the successful branching occurs. When the branching is not successful the third time when the branching conditions are determined, the fourth flow is brought into the stage P1, and if the branch is successful at this point, processing for instructions in as many three flows which have already aborted are cancelled and the branching address branch-to instruction enters the stage P1.

As is obvious from the above explanation, when the BXH instruction and BXLE instruction are executed in the prior art system for this example, five cycles are required for successful branching, while two cycles for unsuccessful branching. There is a large difference in the number of cycles and the processing for the three flows must be cancelled when the branching has been conducted successfully.

The differences in number of cycles for successful and unsuccessful branching complicates the processing of successive instructions, that is cancellation of many flows is complicated and requires time consuming processing for instruction cancellation (for example, requests for cancellation in the buffer memory and main memory, etc.). The disadvantages mentioned above result in large in efficiency problems during practical use.

SUMMARY OF THE INVENTION

In consideration of the disadvantages in the prior art described above, it is an object of the present invention to provide a system which quickly determines the branching conditions, reduces invalid flows in the pipeline and executes the BXH and BXLE instructions at a high speed in a data processing unit which processes the BXH and BXLE instructions using a pipeline.

This object can be attained, according to the present invention, by providing a system for executing calculations for determining branching conditions without delay due to extraction of branch-to instructions by utilizing an adder used for address calculation and has an advantage in that the BXH and BXLE instructions are processed at a high speed.

BRIEF DESCRIPTION OF THE DRAWINGS

Figure 1:
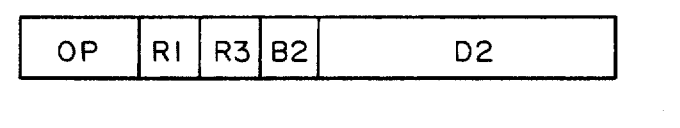

FIG. 1 is a format of a branching instruction related to the present invention.

DESCRIPTION OF THE PREFERRED EMBODIMENTS

Figure 3:
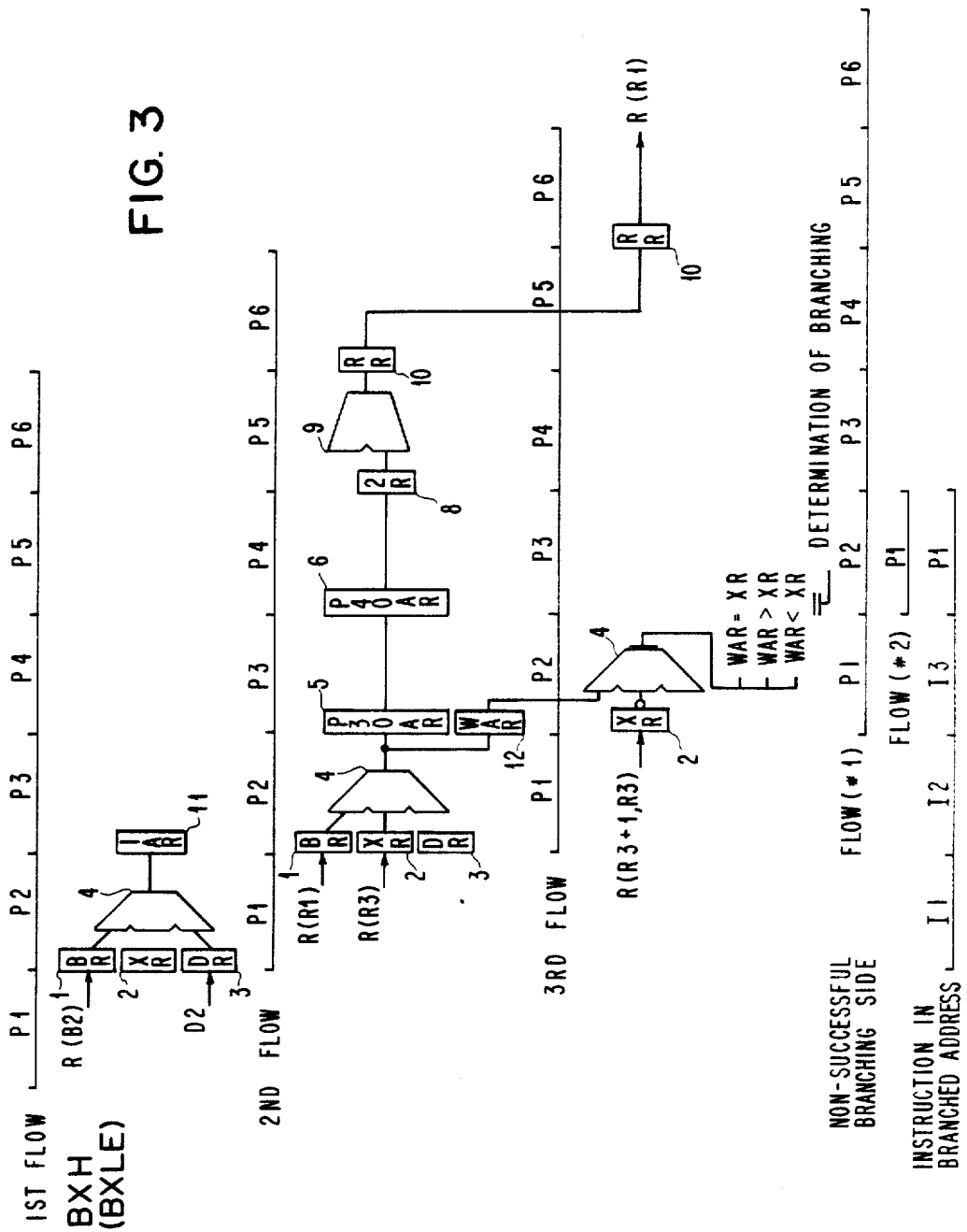
FIG. 3 is a schematic profile of an embodiment of the present invention.
Figure 4:
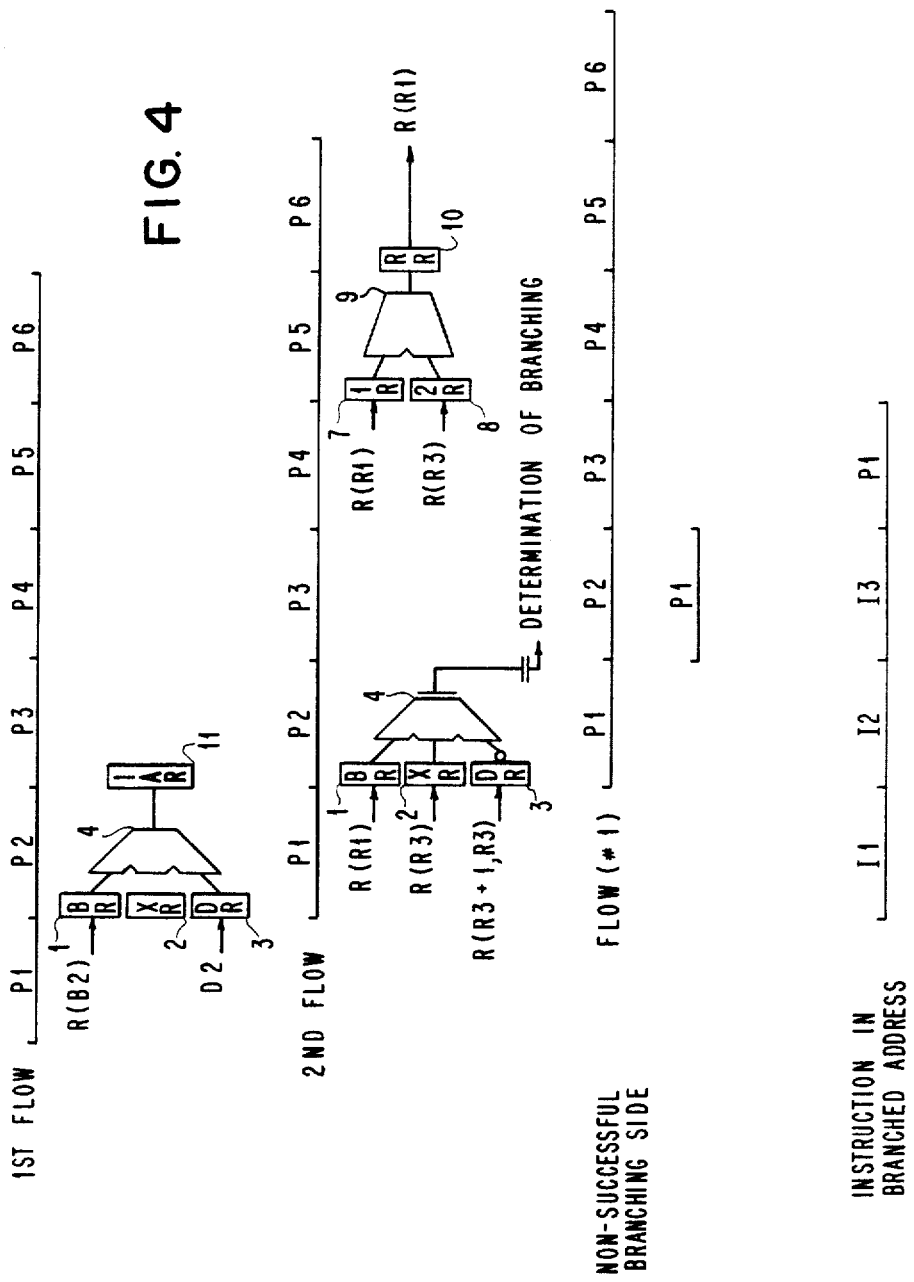
FIG. 4 is a schematic profile of an embodiment of the present invention.
Figure 5:
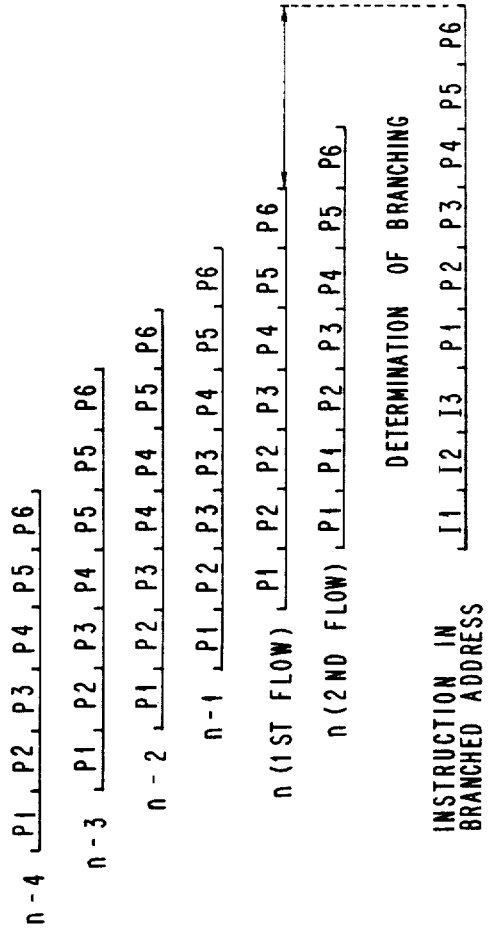
FIG. 5 is an example of the effect of the embodiment shown in FIG. 4.

FIG. 3 shows a schematic profile of an embodiment of the present invention and FIG. 4 is a schematic profile of another embodiment of the present invention. FIG. 5 is an example of the effects of the embodiment shown in FIG. 4 and respective elements shown in FIG. 3 and FIG. 4 are the same as those in FIG. 6.

The subject matter of the embodiment shown in FIG. 3 operates as follows. A branching address is first obtained in the stage P2 of a first flow, the address generating circuit (adder circuit 4) is used not only for addition of the index of the first operand and the increment but also for comparison with the comparison number, and the branching processing is determined earlier than the processing which is executed using the operand calculation part (circuit 9) in stage P5 of the first flow.

Figure 2:
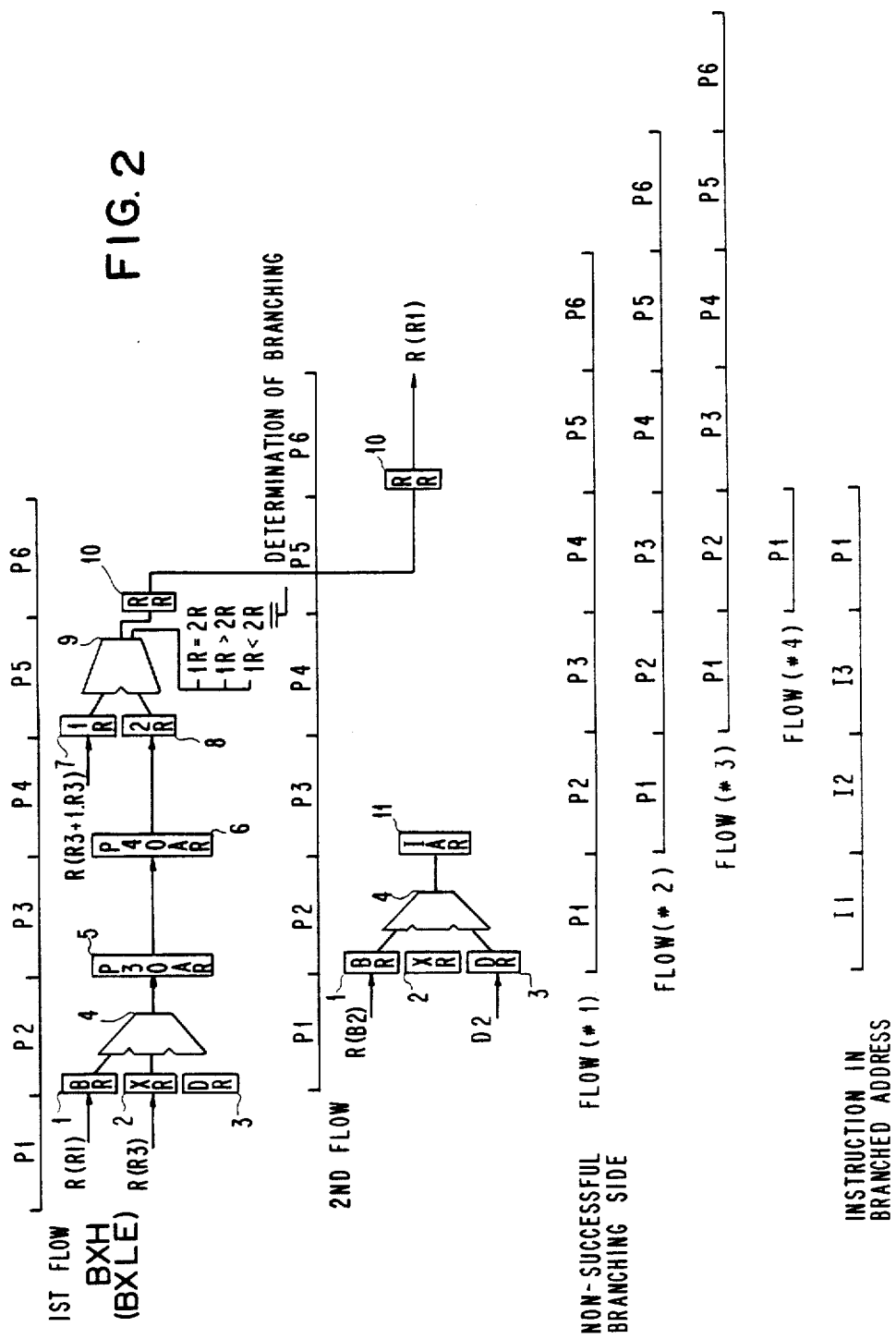
FIG. 2 is a schematic profile of operations when executing branching instruction in the prior art.

In FIG. 3, 1–6 and 8–11 correspond to the same circuits in FIG. 2 and 12 is a work address register (hereinafter referred to as WAR). In this figure, a base value from general purpose register B2 is loaded into BR 1 in stage P2 of the first flow of the branching instruction, a displacement value of D2 is loaded into DR 3 (XR 2 is not used), BR 1 and DR 3 are added in the 3-input adder 4, and a branching address is generated and loaded into IAR 11 in stage P3. Simultaneously with address generation in stage P2 the branching address instruction fetch pipeline is started, that is the fetch of the branch-to instruction is started. As a result, the branch-to instruction in the branching address instruction fetch pipeline advances to the stages I2 and I3 starting at the timing of stage P2 (corresponding to the stage I1) of the first flow.

In the stage P2 of the second flow, a value of general purpose register R1 is loaded into BR 1 and a value of general purpose register R3 is loaded into XR 2 (DR 3 is not used), the contents of BR 1 and XR 2 are added in the 3-input adder 4 (that is, the address generating circuit), the resulting operand address is then loaded into P30AR 5 and WAR 12 as an added value resulting from adding the first operand and increment and is propagated in the pipeline.

In the pipeline, the value is loaded into 2R 8 in the stage P5 via the operand address register P40AR 6 of stage P4 and the register P30AR 5 of stage P3 and then set in or loaded into the result register RR 10 at the beginning of stage P6 through the adder 9.

In stage P2 of the third flow, a comparison number which is a value in general purpose register R3+1 or R3 is loaded into XR 2, the subtraction of XR 2 from WAR 12 of the second flow is carried out in the 3-input adder 4 (namely, calculation for comparison), the relationship between the values of WAR 12 and XR 2 is obtained from the subtraction result to determine whether the branching is to occur.

By this time, the branching address instruction fetch pipeline has fetched the instruction at the branching address and the branch-to instruction immediately enters the stage P1 when the branching is carried out successfully.

Updating the index by adding the increment to the index value of the first operand (being loaded into RR10 in the stage P6 of the second flow) and loading the result into general purpose register R1 is carried out with the general purpose registers RR10 to R1 at the end of stage P6 of the third flow.

In FIG. 3, it should be noted that the branching address is first obtained in the first flow and that the address generating circuit (1, 2, 3, 4) is used for the comparison. Employment of such a system simplifies the control for cancellation of a flow when the branching is carried out successfully because only one flow of instructions due to unsuccessful branching is executed until the branching conditions are determined and branching occurs.

When the branching is successful, four processing cycles are necessary but when branching is not successful, three processing cycles are necessary. The difference in the number of processing cycles is reduced as compared with the prior art system, control is much simplified and the overall performance can be improved.

Another embodiment of the present invention is explained by referring to FIG. 4. A branching or branch-to address of the first flow is obtained as in the case of FIG. 3. In the second flow, addition of the index of the first operand and the increment and subtraction of the comparison number are carried out simultaneously utilizing the adder 4 which is a 3-input adder. As a result, the relationship between the added value and comparison number and thereby, branching conditions are determined more quickly.

In FIG. 4, 1–4 and 7–11 correspond to the units previously explained with reference to FIG. 2. In FIG. 4, a value of general purpose register B2 is loaded into BR 1, a value of D2 is loaded into DR 3, BR 1 and DR 3 are added by the 3-input adder 4, the branching address is generated in the stage P2 of the first flow of the branching instruction and the branching address is loaded into IAR 11 in the stage P3. The branching address instruction fetch pipeline for fetching the branch-to instruction is started as soon as the address is generated in stage P2. As a result, the branch-to instruction in the branching address instruction fetch pipeline advances through stages I1, I2 and I3 starting at the timing (corresponding to stage I1) of stage P2 of the first flow, the instruction is output to the stage P1.

In the stage P2 of the second flow, a value of general purpose register R1 is loaded into BR 1, a value of general purpose register R3 is loaded into XR 2 and a comparison number which is a value of general purpose register R3 or R3+1 is loaded into DR 3. The relationship between the added value of the index of the first operand and the increment and the comparison number can be obtained in one calculation cycle at stage P2 by executing the calculation of "BR 1+XR 2+(2's complement of DR 3)" in the address generating circuit and conditional branching can be determined immediately.

At this time, the branch-to instruction fetched into pipeline is at the stage I2 and a waiting condition is required for as long as one cycle until the fetched instruction advances to the stage I3 where the branching address instruction is output where it enters immediately the stage P1.

In the stage P5 of the second flow, a value of general purpose register R1 and a value of general purpose register R3 are respectively loaded into 1R 7 and 2R 8, these are added by the adder 9 of the calculation part. The result is loaded into RR 10 at the beginning of stage P6 and is set in or loaded into general purpose registers RR 10 to R1 at the end of stage P6. Thereby, updating the index where an increment is added to the index value of the first operand and loaded into the general purpose register R1 can be realized.

In FIG. 4, it should be noted that addition of the index of the first operand and increment and subtraction of the comparison number for the result of addition are conducted simultaneously by the 3-input adder 4 in the address generating circuit and thereby the branching determination conditions are obtained in one cycle.

Employment of such a system simplifies the control for cancellation of the flow when the branching is successful because only one flow of instructions run until the branching condition is determined.

In this case, four cycles are necessary when the branching is successful but only two cycles are necessary when the branching is not successful.

When the pipeline is in a "waiting" condition due to other conditions three cycles are necessary even when branching is successful if the branching address instruction fetch pipeline is started and performance can be much improved.

This example is explained by referring to the timing chart of FIG. 5. In FIG. 5, n is the branching instruction and it produces two possible flows for execution as explained with respect to FIG. 4. If the calculator stage P5 requires two cycles, for example, for processing of the n-3 instruction, the "waiting" condition is generated at the stage P4 in the n-2 instruction, it is generated at the stage P3 in the n-1 instruction, and the "waiting" condition is respectively generated at the stage P2 in the first flow or at the stage P1 in the second flow of the branching instruction n. As a result, when the branching is determined in the pertinent branching instruction n (namely, at the stage P2 of the second flow), the branch-to instruction in the branching address instruction fetch pipeline is at the stage I3, and immediately enters the stage P1 when the branching is successful and three processing cycles of the branching instruction are required virtually.

This effect is due to the fact that the delay for the instruction fetch pipeline, because the branching address instruction is not yet fully fetched (namely at the stage I2) when the branching is determined, which has been explained in FIG. 4, has been absorbed by the "waiting" condition generated in the hardware pipeline.

Figure 6:
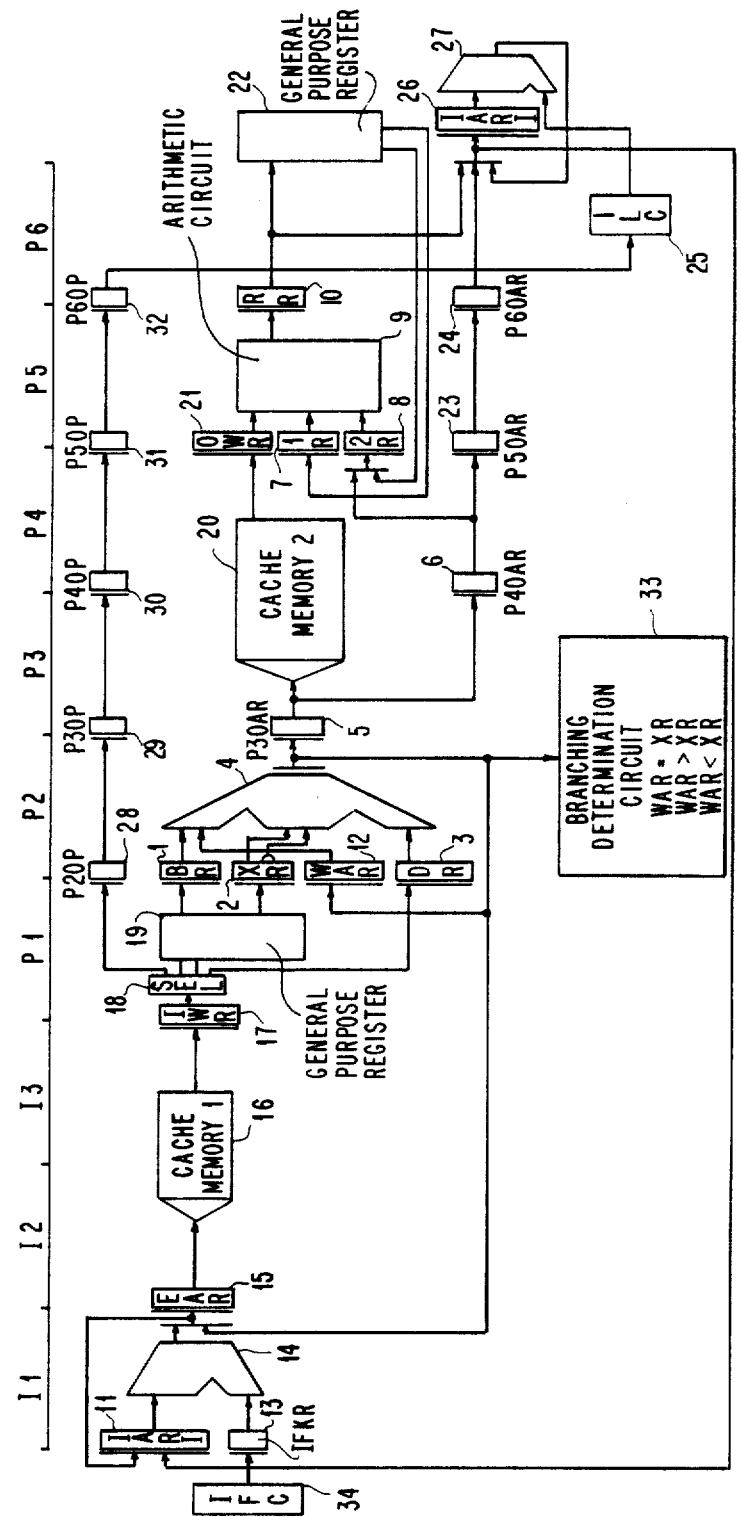
FIG. 6 is an overall constitution of essential part of an embodiment of the present invention.

FIG. 6 shows the entire structure of the essential parts of an embodiment of the present invention which performs processing operations explained with respect to FIG. 3 and FIG 4. 34 at the extreme left side of this figure is an instruction fetch control unit (IFC), which sets "0" into the instruction fetch constant register (IFKR) 13 when the first instruction is read and sets a constant value "8" into the IFKR 13 after the reading of the first instruction. For the first instruction, the heading address of the program is loaded into the two instruction address registers (IAR (I)) 11 and (IAR (II)) 26 at the extreme right and left ends. The adder 14 generates an effective address by adding the contents of IAR 11 and IFKR 13 and loads it into the effective address register (EAR) 15. The address conversion buffer (not shown) and cache memory 16 are accessed on the basis of the content of EAR 15 and instructions are sequentially prefetched into the instruction word register (IWR) 17.

The instruction is produced at the stage P1. At the stage P2, (i) the OP area of the instruction is loaded into the register 28 and (ii) operand address of the instruction is calculated by the adder 4. Each operand value is ready to be loaded into the registers 21, 7, 8 through the stages P3 and P4 and the operation result value is calculated by the operation (arithmetic) circuit 9 at the stage P5. The calculation result is obtained at the state P6 and stored in result register 10.

While the instruction passes through stages P3, P4, P5 and P6, the operand address is also shifted through resisters 6, 23, 24. When the instruction exits from the pipeline at the stage P6, the content of the instruction address register (II) 26 is updated by the adder 27 and instruction length generating circuit (ILC) 25. That is, the instruction address register (II) 26 holds the address of the oldest instruction being processed in the pipeline. The branching determination circuit 33 at the lower center of the FIG. 6 carries out the branching determination as shown in FIG. 3 and FIG. 4. The first, second and third flows corresponding to the branch-to instruction described in FIG. 3 and FIG. 4 are processed by adder 4 on a time sharing basis. That is, corresponding to FIG. 3, for example, the adder 4 shown in FIG. 6 is used for determining the content of IAR 11 at the stage P2 of the first flow and for update of the index value at the stage P2 of the second flow and also used for determination of branching even at the stage P2 of the third flow.

The above explanation is intended to apply to the BXH and BXLE instructions but it is a matter of course that the present invention can be adapted to the other branching instructions which require three operations such as calculation of branching address, determination of branching conditions and other calculations.

We claim:

1. A branching control system for controlling branching based upon a branching condition in a data processing unit that fetches instructions in an instruction pipeline and processes instructions in multiple passes through a hardware operation pipeline which includes a first cycle for performing instruction decoding and selection of general purpose registers, a second cycle for calculating addresses and generating memory access requests, a third cycle for performing further address calculations, and subsequent cycles, said data processing unit processing a branching instruction which includes a plurality of fields, one of which represents a displacement and other of which designate an increment, a comparison number, a base and an index, said branching control system comprising:

adding means, operative during a second cycle of a first pass through the hardware operation pipeline, for adding the base and displacement to calculate a branching address from a branching instruction which was decoded during a first cycle of the first pass;

fetch means, operative during third and subsequent cycles of the first pass through the hardware operation pipeline, for fetching an instruction designated by the branching address calculated by said adding means; and said adding means, operative during a second cycle of a second pass through the hardware operation pipeline which corresponds to a third cycle of the first pass, for adding the index to the increment to produce a result and, operative during a second cycle of a third pass through the hardware operation pipeline which corresponds to a third cycle of the second pass, for comparing the result with the comparison number to produce the branching condition;

whereby the branching condition is determined during a vacant cycle of address calculation corresponding to a third cycle of the second pass through the hardware operation pipeline.

2. A branching control system according to claim 1, wherein said branching control system further comprises:

means for determining whether branching is successful;

instruction fetch processing means for generating an instruction address; and instruction executing means for executing the branching instruction, said instruction fetch processing means including means for sequentially fetching successive instructions following said branching instruction and for sequentially fetching instructions in dependence on the branching address, said instruction executing means including means for beginning execution of the successive instructions during the fetching of instructions dependent on the branching address, and said instruction fetch processing means further including means for, when the branching is successful, sending the instructions fetched in dependence on the branching address to said instruction executing means and invalidating the successive instructions executed by said instruction execution means during the fetching of the instructions dependent on the branching address.

3. A branching control system according to claim 2, wherein said adding means includes an address generating circuit for adding said increment to said index and for determining said branching condition by a calculation comparison between the result and the comparison number.

4. A branching control system according to claim 3, wherein said address generating circuit includes 2's complement means for 2's complementing the comparison number an da 3-input adder having first, second and third inputs, said index is applied to the first input, said increment is applied to the second input, and the 2's complement of the comparison number is applied to the third input and addition of the three inputs is carried out to determine the branching condition.

5. A branching control system according to claim 2, wherein said instruction fetch processing means determines the branching address at least prior to instruction execution when the branching instruction is to be executed by said instruction executing means.

6. A pipeline data processing unit for receiving and processing a branch instruction, the branch instruction designates a base address, an increment, an index and a branch comparison number, said pipeline data processing unit including an instruction pipeline for fetching instructions and a hardware operation pipeline for processing the instructions by multiple passes through the same, said pipeline data processing unit comprising:

instruction fetch means for fetching a first instruction including base, increment and index register designations, a displacement, and a first instruction stream in dependence on a first instruction address;

branching address calculation and comparison means, connected to said instruction fetch means, for calculating a branching address from the base address and the displacement during a second cycle of a first pass through the hardware operation pipeline if the first instruction is the branch instruction and applying the branching address to said instruction fetch means, said instruction fetch means fetching a second instruction stream designated by the branching address during third and subsequent cycles of the first pass through the hardware operation pipeline, and for determining, while the second instruction stream is being fetched and during a vacantg cycle of address calculation, whether a branch should occur by adding the index and the increment during a second pass through the hardware operation pipeline which corresponds to a third cycle of the first pass to produce a result and comparing the result to the branch comparison number during one of the second cycle of the second pass through the hardware operation pipeline and a second cycle of a third pass through the hardware operation pipeline; and instruction execution means, connected to said branching address calculation and comparison means, for executing one of the first and second instruction streams in dependence on the comparison.

7. A pipeline data processing unit as recited in claim 6, wherein said instruction fetch means comprises:
an instruction address register, operatively connected to said branching address calculation and comparison means, for storing the first instruction; and
an instruction cache memory, operatively connected to said instruction address register and said branching address calculation and comparison means, for storing instructions;

wherein said branching address calculation and comparison means comprises:
2's complement means for generating a 2's complement of the branch comparison number; and
a three input adder, operatively connected to said instruction pipeline for, first, adding the base and the displacement and, then, adding the index, the increment and the 2's complement of the branch comparison number while the second instruction stream is being fetched and during the vacant cycle of address calculation; and wherein said instruction execution means comprises:
an operand cache memory, operatively connected to said three input adder, for outputting operand values in dependence upon the instruction executed; and
an operand value processing circuit, operatively connected to said operand cache memory, for producing a result in dependence on the instruction executed and the operand values.

8. A method used in a data processing system including an instruction pipeline for fetching instructions and a hardware operation pipeline for processing the instructions by multiple passes through the same, said data processing system executes a branching instruction including a displacement and designating a base, an increment, an index and a branch comparison number said method comprising the steps of:

(a) calculating a branching address from the base and displacement in a second cycle of a first pass through the hardware operation pipeline;

(b) fetching, a branch-to instruction at the branching address during third and subsequent cycles of the first pass through the hardware operation pipeline;

(c) determining whether a branch to the branch-to instruction should occur, during said fetching of the branch-to instruction, by adding, during a second cycle of a second pass through the hardware operation pipeline, the index and increment and subtracting, during one of the second cycle of the second pass through the hardware operation pipeline and a second cycle of a third pass through the hardware operation pipeline, the branch comparison number; and (d) executing the branch-to instruction in dependence upon said determining in step (c).

9. A method as recited in claim 9, further comprising the steps of:
- (e) beginning execution of a next instruction sequentially following the branching instruction during said fetching of the branch-to instruction; and
- (f) invalidating the next instruction sequentially following the branching instruction during execution in dependence on the determining in step (c).

10. A method as recited in claim 9, wherein step (c) includes the steps of:
- (c1) adding the index and increment to produce an incremented index during the second cycle of the second pass through the hardware operation pipeline;
- (c2) storing the incremented index in a register;
- (c3) subtracting the branch comparison number from the incremented index during the second cycle of the third pass through the hardware operation pipeline; and
- (c4) replacing the index with the incremented index.

11. A method as recited in claim 9, wherein step (c) includes the steps of:
- (c1) adding the index and increment and subtracting the branch comparison number using a three input adder during the second cycle of the second pass through the hardware operation pipeline;
- (c2) calculating an incremented index by adding the index to the increment; and
- (c3) replacing the index with the incremented index.

12. A branching control system for controlling branching based upon a branching condition in a data processing unit that fetches instructions in an instruction pipeline and processes instructions in multiple passes through a hardware operation pipeline which includes a first cycle for performing instruction decoding and selection of general purpose registers, a second cycle for calculating addresses and generating memory access requests, a third cycle for performing further address calculations, and subsequent cycles, said data processing unit processing a branching instruction which includes a plurality of fields, one of which represents a displacement and other of which designate an increment, a comparison number, a base and an index, said branching control system comprising:
- adding means, operative during a second cycle of a first pass through the hardware operation pipeline, for adding the base and displacement to calculate a branching address from a branching instruction which was decoded during a first cycle of the first pass;
- fetch means, operative during third and subsequent cycles of the first pass through the hardware operation pipeline, for fetching an instruction designated by the branching address calculated by said adding means; and
- said adding means, operative during a second cycle of a second pass through the hardware operation pipeline which corresponds to a third cycle of the first pass, for adding the index to the increment to produce a result and, operative during a second cycle of the second pass through the hardware operation pipeline which corresponds to a third cycle of the first pass, for comparing the result with the comparison number to produce the branching condition;
- whereby the branching condition is determined during a vacant cycle of address calculation corresponding to a third cycle of the first pass through the hardware operation pipeline.

13. A branching control system according to claim 12, wherein said branching control system further comprises:
- means for determining whether branching is successful
- instruction fetch processing means for generating an instruction address; and
- instruction executing means for executing the branching instruction,
- said instruction fetch processing means including means for sequentially fetching successive instructions following said branching instruction and for sequentially fetching instructions in dependence on the branching address,
- said instruction executing means including means for beginning execution of the successive instructions during the fetching of instructions dependent on the branching address, and
- said instruction fetch processing means further including means for, when the branching is successful, sending the instructions fetched in dependence on the branching address to said instruction executing means and invalidating the successive instructions executed by said instruction execution means during the fetching of the instructions dependent on the branching address.

14. A branching control system according to claim 13, wherein said adding means includes an address generating circuit for adding the increment to the index and for determining the branching condition by a calculation comparison between the result and the comparison number.

15. A branching control system according to claim 14, wherein said address generating circuit includes 2's complement means for 2's complementing the comparison number and a 3-input adder having first, second and third inputs, the index is applied to the first input, the increment is applied to the second input, and the 2's complement of the comparison number is applied to the third input and addition of the three inputs is carried out to determine the branching condition.

16. A branching control system according to claim 13, wherein said instruction fetch processing means determines the branching address at least prior to instruction execution when the branching instruction is to be executed by said instruction executing means.

* * * * *

UNITED STATES PATENT AND TRADEMARK OFFICE
CERTIFICATE OF CORRECTION

PATENT NO. : 4,977,496

DATED : December 11, 1990

INVENTOR(S) : Katsumi Onishi et al.

It is certified that error appears in the above-identified patent and that said Letters Patent is hereby corrected as shown below:

```
Col. 3,   line 53, "P4" s/b --P1--.
Col. 9,   line 29, "an da" s/b --and a--;
          line 65, "vacantg" s/b --vacant--.
Col. 11,  line 1, "9" s/b --8--.
Col. 12,  line 16, "ful" s/b --ful;--.
```

Signed and Sealed this

Thirtieth Day of June, 1992

Attest:

DOUGLAS B. COMER

Attesting Officer

Acting Commissioner of Patents and Trademarks